July 16, 1946.  A. H. YOCH  2,404,019
BILLET NICKING MACHINE
Filed Dec. 15, 1942    2 Sheets-Sheet 1
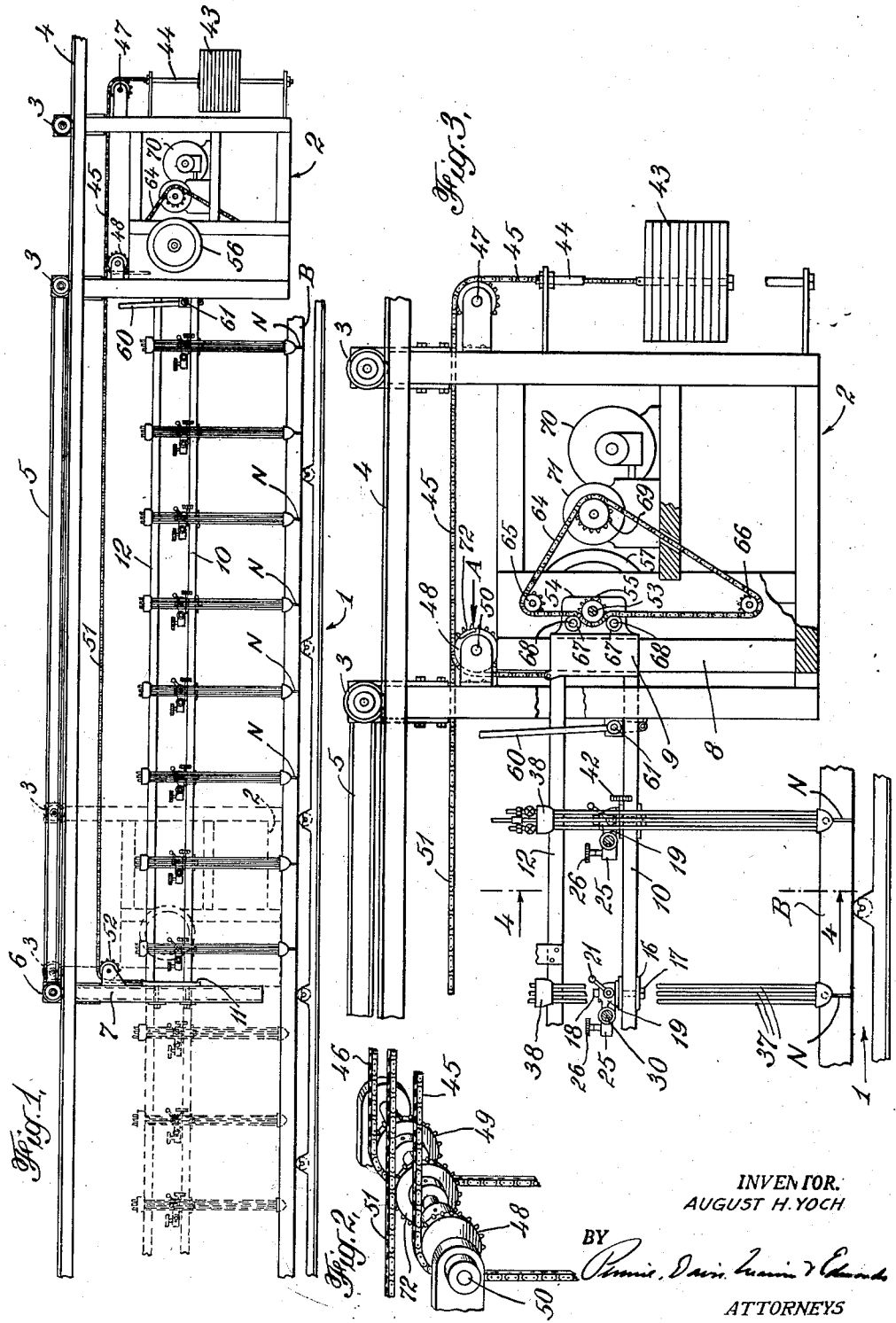
INVENTOR.
AUGUST H. YOCH
BY
ATTORNEYS July 16, 1946.　　　　A. H. YOCH　　　　2,404,019
BILLET NICKING MACHINE
Filed Dec. 15, 1942　　　　2 Sheets-Sheet 2
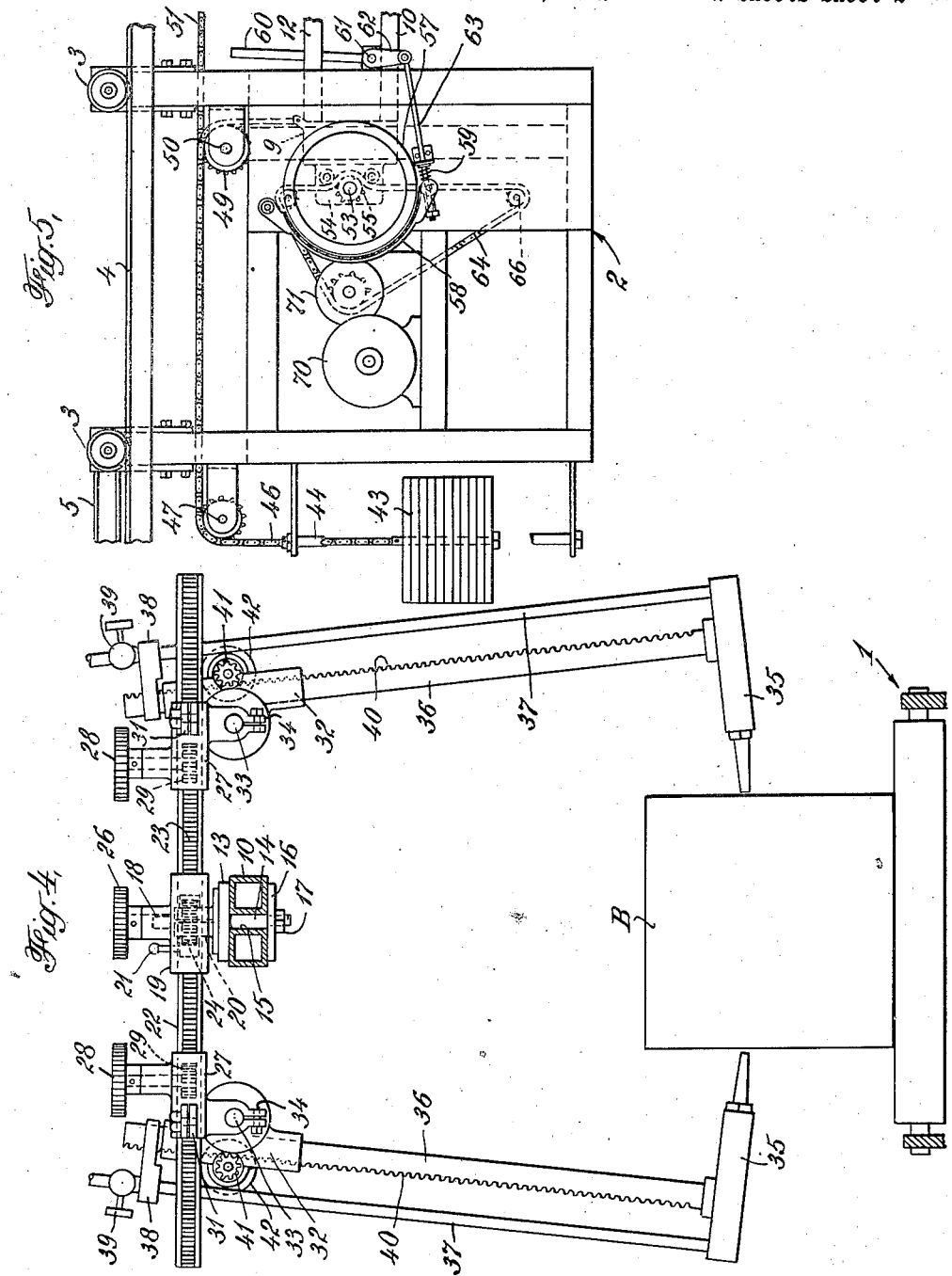
INVENTOR
AUGUST H. YOCH
BY
ATTORNEYS Patented July 16, 1946

2,404,019

UNITED STATES PATENT OFFICE 2,404,019

BILLET NICKING MACHINE

August H. Yoch, Melrose, Pa., assignor to Air Reduction Company, Incorporated, a corporation of New York Application December 15, 1942, Serial No. 469,073

6 Claims. (Cl. 266—23)

This invention relates to improvements in billet nicking apparatus of the type disclosed in my copending application, Serial No. 426,155, filed January 9, 1942, now Patent No. 2,317,239 issued April 20, 1943.

Billet nicking is performed to make it possible to break a relatively long billet into short lengths which may be used as blanks in the manufacture of ordnance shells, or for other purposes. A convenient way of nicking billets for this purpose is to score them at evenly spaced points with oxygen cutting torches. The above-mentioned patent discloses apparatus for nicking billets by means of such torches, the apparatus being designed to nick the billet simultaneously at several places along the length of the billet, to speed up production of the nicked billet and the blanks into which they are subsequently broken.

The present application is directed to certain improvements in the apparatus disclosed in said patent which improvements still further speed up production of the nicked billets and the blanks and facilitate operation and control of the apparatus.

Whereas the torch supporting arm of the apparatus disclosed in the patent is intended to carry only a few torches spaced lengthwise of the billet and projects from the frame of a carriage in cantilever fashion and is guided and counterbalanced only at its end adjacent the carriage, the torch supporting arm or bar of this invention is made much longer to carry a considerably larger number of torches, and the frame of the carriage is extended to the far end of the torch bar where it serves to guide that end of it, and the counterweight acts on both ends of the torch bar. Power from a motor is applied to the end of the torch supporting bar nearest the carriage but the counterweighting is so done as to cause, by the employment of simple means, both ends of the torch supporting bar to move in unison and at the same speed during the nicking operation.

Another feature of the invention relates to a friction brake and its operating means for stopping the rotation of the shaft which, upon such stopping, causes the torch supporting bar and all of the torches to move upwardly as a unit transversely of the billet to make the nicks therein.

One form of the improved apparatus is illustrated in the accompanying drawings, in which:

Figure 1 is a side elevation of the apparatus;

Fig. 2 is a partial perspective view of the sprocket shaft at the forward end of the carriage as viewed in the direction of the arrow A in Fig. 3;

Fig. 3 is an enlarged view of the right end of the apparatus shown in Fig. 1, the carriage being shown partly in section;

Fig. 4 is a transverse vertical section taken on the line 4—4 of Fig. 3; and

Fig. 5 is an enlarged side elevation of the carriage, showing the side opposite to that shown in Fig. 1.

A billet B is supported on the rollers of a conveyor or mill table 1. The billet remains stationary on the conveyor during the nicking operation.

A carriage 2 has wheels 3 that run on rails 4 extending parallel to the billet. The frame of the carriage 2 has a forward extension 5 located above the rails 4, and the far end of this extension is provided with wheels 6 which also run on the rails 4. The forward end of the frame-extension 5 is rigidly secured to a depending vertical guide post 7. The carriage 2 has a vertical guide post 8 (Fig. 3). A sliding frame 9 is mounted to slide up and down on the post 8. A torch supporting bar 10 is rigidly connected at its rear end to the sliding frame 9 and extends forwardly parallel to the top surface of the billet and at its forward end is rigidly connected to a sliding block 11 (Fig. 1) which is adapted to slide up and down on the vertical guide post 7. A second bar 12 extends between the sliding frame 9 and the sliding block 11 and this is utilized to carry the clamps which support the hose (not shown) leading to the torches.

In the particular apparatus shown in the drawings there are eight pairs of cutting torches supported by the bar 10. Each pair of torches is mounted on the bar 10 by means of a support 13 (best shown in Fig. 4) provided with a bolt 14 which extends downwardly through a longitudinal slot 15 in the bar 10. The lower end of the bolt 14 carries a disc or washer 16 and a nut 17. The support 13 may be adjusted longitudinally of the bar 10 to properly position the pair of torches carried by the support and when the nut 17 is tightened the support is clamped to the bar 10 by means of the disc or washer 16.

The support 13 has an upwardly extending post 18. A bracket 19 is supported on the post 18 by means of a split clamp 20. The clamp 20 may be tightened by means of a hand lever 21 to cause the clamp to grip the post 18. A cross bar 22 extends through the bracket 19 and is provided on one side with rack teeth 23. These rack teeth engage with a pinion 24 mounted in a forward extension 25 of the bracket 19 (Fig. 3). The pinion 24 may be turned by a knob 26 to shift the cross bar 22 one way or the other in the direction of its length and transversely of the billet.

There is a torch-holder bracket 27 on the cross bar 22 at each side of the center bracket 19. Each of the brackets 27 has a knob 28 that turns a pinion 29 meshing with the rack teeth 23 to shift the torch-holder bracket 27 lengthwise along the cross bar 22. Although slidable along the cross bar 22, each of the torch-holder brackets 27 has a key that extends into a key-way 30 (Fig. 3) in the side of the bar 22 opposite the rack teeth to prevent angular movement of the bracket 27 on the cross bar 22. A similar key in the bracket 19 prevents rotation of the cross bar 22 in this bracket. A split clamp 31 (Fig. 4) on the end of bracket 27 extends around the cross bar 22 and is adjusted to control the friction of the bracket on the bar.

A torch holder 32 is associated with each bracket 27 and has a stud 33 that extends into a split clamp 34 at the lower end of the torch-holder bracket. The torches used for nicking the billet each comprises a tip 35, a long rod 36 extending upwardly from the tip, gas supply tubes 37 connected at their lower ends with the tip, a block 38 at the upper end of the rod 36 for holding the upper ends of the tubes 37, and the valves 39 that control the supply of gas to the tubes. There are rack teeth 40 on the rod 36 and the rod extends through a bearing in the torch holder. A pinion 41 in the torch holder meshes with the rack teeth 40 and can be turned by a knob 42 to raise and lower the torch in the holder 32.

The torches on both sides of the billet are the same, and so are the torch holders 32 except for the necessary reversals to keep the adjusting knob at the back in both torch holders and to support the torches one on the right and the other on the left side of the billet with the tips directed toward opposite faces of the billet as best shown in Fig. 4.

It will be apparent that the spacing of the torches can be changed, to accommodate the apparatus to billets of different width, by turning either of the knobs 28. With the torches adjusted for billets of a particular width, the torches can be moved as a unit to accommodate them to a billet that is not centrally located on the conveyor by turning the knob 26.

As above stated the torch supporting bar 10 is made long enough to accommodate a number of pairs of torches, there being eight pairs of torches supported on the bar in the particular apparatus shown in the drawings. The torch supporting bar is therefore counterweighted at both ends. At the rear of the carriage 2 a counterweight 43 is mounted to slide on vertical rods 44. The counterweight is connected to two chains 45 and 46 (see Fig. 2) which pass over two sprockets secured to a shaft 47 rotatably mounted at the rear of the carriage 2. The forward ends of these chains pass downwardly around two sprockets 48 and 49 secured to a shaft 50 rotatably mounted at the forward end of the carriage 2 (Figs. 2 and 3). The chains 45 and 46 are connected at their forward ends to the sliding frame 9 which supports the rear end of the torch bar 10, the two chains being connected to opposite sides of this frame. A third chain 51 is also connected to the counterweight 43 and passes over a third sprocket on shaft 47 and extends forwardly to the post 7 where it passes downwardly around a sprocket 52 secured to a shaft rotatably mounted on the post. The end of the chain 51 is connected to the sliding block 11 which supports the forward end of the torch-carrying bar 10. It will thus be seen that the torch bar 10 is counterbalanced at both ends.

Motor-operated mechanism for moving the sliding frame 9 at a uniform speed during the nicking stroke of the torch tips is best shown in Fig. 3. A cross shaft 53 is supported by and rotatable in lugs 54 extending from the back of the sliding frame 9. A sprocket 55 is keyed to the shaft 53 between the lugs in which the shaft turns. The shaft 53 extends the full width of the carriage 2. At one end the shaft 53 carries a hand-wheel 56 (Fig. 1) and at its other end it carries a brake wheel 57 (Fig. 5) which is controlled by a friction brake 58. The brake 58 is normally held in "off" position by a spring 59. The brake is operated by a handle 60 positioned at the opposite side of the carriage, i. e., at that side of the carriage where the hand-wheel 56 is located. The handle 60 is connected to a rock shaft 61 mounted at the forward end of the carriage 2 and extending transversely across the same. At the side of the carriage where the brake 58 is located the rock shaft 61 carries an arm 62 (Fig. 5) which is connected by means of a rod 63 to the brake. It will be apparent that the handle 60, at one side of the carriage, may be actuated to apply the brake 58 to the wheel 57 at the opposite side of the carriage.

A driving element comprising a chain 64 passes around sprocket wheels 65, 66 (Fig. 3) mounted on the carriage and disposed to give the chain 64 a run which is generally parallel to the guide post 8. This run of the chain 64 is engaged by the sprocket 55 and held against this sprocket by rollers 67 on axles 68 supported by the lugs 54 at the back of the sliding frame 9.

The sprocket wheels 65, 66 are idlers, but the chain 64 passes around a sprocket wheel 69 that is driven by an electric motor 70 through reduction gearing 71. The motor operates continuously and when the sliding frame 9 is stationary the chain 64 rotates the sprocket 55, the shaft 53, and the wheels 56, 57 carried by the ends of the shaft. The machine shown in the drawings nicks the billet when the torches are moving up and the chain 64 is, therefore, driven in a direction that causes it to move up along the run of the chain that is parallel to the guide post 8. If the apparatus were designed to nick the billet during downward movement of the torches the chain 64 would be driven in the opposite direction.

The lineal speed of the chain 64 is made equal to the desired speed of translation of the torches during the cutting or nicking stroke. The sliding frame 9 can be made to move upwardly at the lineal speed of the chain 64 by operating the hand lever 60 to apply the brake 58. The shaft 53 and the sprocket 55 will then be held against rotation and the upwardly moving run of the chain will carry with it the sprocket and the sliding frame 9. The brake 58 is therefore a control device for causing operative connection of the sliding frame 9 with the driving element (chain 64) and thus serves the function of a clutch. The sliding frame 9 can be moved in the opposite direction to return it to its original position and in preparation for the next nicking operation by manually rotating the hand wheel 56 at a rate faster than the speed at which the chain 64 turns this hand wheel when the sliding frame 9 is stationary on the guide post 8. The motor 70 is equipped with a centrifugal governor (not shown) that is adjustable to control the motor speed and the speed of the chain 64.

Both ends of the torch supporting bar are caused to move in unison and at the same speed in a simple way by causing the chain 51, which connects the counterweight to the forward end of the torch supporting bar, to engage a sprocket 72 (Fig. 2) secured to the same shaft (the shaft 50) that carries the sprockets 48 and 49. All three of the sprockets are the same size. Thus when the sliding frame 9 is moved upwardly by the motor the chains 45 and 46 cause the shaft 50 to rotate and the rotation of this shaft governs the speed at which the forward end of the torch-supporting bar moves and causes it to move at the same speed as the rear end of the bar and in unison therewith.

In using the apparatus the torches are adjusted on the torch supporting bar 10 so that they are equally spaced and so that the distance between adjacent torches is equal to the length of the pieces or blanks into which it is desired to break the billet. The apparatus and the billet are brought into proper relative position for the nicking operation and then, assuming that the torches are in their lowermost position and have been properly adjusted and the motor is running, the handle 60 is operated to apply the brake 58 to the wheel 57 to stop the rotation of the sprocket 55. The moving chain 64 will then cause all of the torches to move upwardly as a unit, i. e., transversely of the billet. Each pair of torches will cut nicks in opposite sides of the billet, the nicks being indicated at N in Figs. 1 and 3. When the brake 58 is released the upward movement of the torches will cease. They may be lowered again by rotating the hand wheel 56 at a rate faster than the speed at which the chain 64 turns it, as hereinbefore described. The billet is then moved longitudinally with respect to the apparatus, or the carriage and frame are moved along the rails 4, to the position indicated by dot and dash lines in Fig. 1 so that during the next nicking operation the first nick of the second series will be spaced from the last nick of the first series a distance equal to the spacing between the other nicks. The nicking operation is then repeated. During each nicking operation both ends of the torch supporting bar are caused to move in unison, and at the same speed, as hereinbefore described so that all of the torches traverse the billet in unison and at the same speed. Since a number of nicks may be simultaneously cut along the length of the billet the number of times that the apparatus has to be positioned and adjusted with respect to the billet is correspondingly reduced. If the apparatus has eight pairs of cutting torches, as is the case with the apparatus illustrated in the drawings, such reduction amounts to approximately 88%.

If desired the torches may be spaced apart lengthwise of the billet a distance which is a multiple of the length of the blanks to be produced. For instance, the spacing between the torches may be twice as great as the desired length of the blanks and in this case after the first series of nicks are cut in the billet the torches may be moved lengthwise of the billet, or the billet moved with respect to the torches, a distance which is equal to the length of the blanks. If the spacing between the torches is three times as great as the length of the blanks to be produced it will, of course, be necessary after the first nicking operation to perform two more nicking operations, each time shifting the torches or the billet a distance equal to the length of the blank to be produced, and so on.

While the nicking instrumentalities herein shown and described are oxygen cutting torches it should be understood that high temperature cutting devices of any other type may be used instead if they are capable of making nicks of the proper kind in the billets and if they can be associated with the other parts of the apparatus in about the same way as the torches.

I claim:

1. In a billet nicking machine or the like having a pair of rails, a carriage whose frame is provided at its upper portion with wheels running on the rails whereby the carriage depends from the rails and a vertically movable tool support extending horizontally from the carriage and substantially parallel to the billet and the end of which nearest the carriage is guided on a guide carried by the carriage frame, the improvement which comprises an extension on the carriage frame above the tool support which extends the full length of the tool support thereof, wheels on the far end of said extension to support it on said rails, and a guide depending vertically from the far end of said frame extension for the far end of the support.

2. In a billet nicking machine or the like having an elongated horizontally disposed vertically movable tool support, a counterweight therefor, and means acting on one end of the support for moving the support vertically, the improvement which comprises a frame in which said support is guided vertically at both ends, a plurality of sprockets rotatably mounted on the frame, and chains connected to said counterweight and to opposite ends of said support and passing over said sprockets, said sprockets comprising two which rotate unitarily and one of which is engaged by a chain connected to one end of the support and the other of which is engaged by a chain connected to the other end of the support.

3. In a billet nicking machine or the like having an elongated horizontally disposed vertically movable tool support, a counterweight therefor, and means acting on one end of the support for moving the support vertically, the improvement which comprises a frame in which said support is guided vertically at both ends, a plurality of sprockets rotatably mounted on the frame, chains connected to said counterweight and to opposite ends of said support and passing over said sprockets, and a shaft rotatably mounted on the frame, two of said sprockets being secured to said shaft one of which is engaged by a chain connected to one end of the support and the other of which is engaged by a chain connected to the other end of the support.

4. In a billet nicking machine or the like having a vertically movable tool support, guiding means along which the support is movable, and driving mechanism for moving the support along the guiding means comprising a chain that has a run extending generally parallel to the guiding means, a rotatable shaft movable with said support, a sprocket on said shaft in position to engage the chain and be rotated by the chain when the support is stationary, and a motor for driving the chain continuously at the desired speed of movement of the support, the improvement which comprises a brake wheel on said shaft, a friction brake associated therewith, and manually operable means for applying said friction brake to arrest rotation of the shaft to cause the tool support to move with the chain.

5. In a billet nicking machine or the like having a vertically movable tool support, guiding means along which the support is movable, and driving mechanism for moving the support along the guiding means comprising a chain that has a run extending generally parallel to the guiding means, a rotatable shaft movable with said support, a sprocket on said shaft in position to engage the chain and be rotated by the chain when the support is stationary, and a motor for driving the chain continuously at the desired speed of movement of the support, the improvement which comprises a friction brake at one end of said shaft adapted when applied to arrest rotation of the shaft to cause the support to move with the chain, manually operable means located adjacent to the other end of said shaft and operatively connected to the friction brake for applying the same, and a hand wheel on that end of the shaft adjacent which said manually operable means for the brake is located.

6. In a billet nicking machine or the like having a frame, a vertically movable tool support, guiding means associated with the frame along which said support is movable, and driving mechanism for moving the support along the guiding means comprising a chain that has a run extending generally parallel to the guiding means, a rotatable shaft movable with the support and extending transversely of said frame from one side thereof to the other, and a sprocket on said shaft in position to engage the chain and be rotated by the chain when the torch-supporting bar is stationary, the improvement which comprises a motor for driving the chain continuously at the desired speed of movement of the support, a friction brake located at one side of said frame adapted when applied to arrest rotation of said shaft to cause the support to move with the chain, a manually operable device connected to the friction brake for applying the same and located at the opposite side of said frame, and a hand wheel on said shaft located at the side of the frame at which said manually operable device is located.

AUGUST H. YOCH.